US008602099B2

(12) United States Patent (10) Patent No.: US 8,602,099 B2
Stehle et al. (45) Date of Patent: Dec. 10, 2013

(54) PROCESS FOR THE PRODUCTION OF MINERAL OIL

(75) Inventors: Vladimir Stehle, Kassel (DE); Konrad Siemer, Kassel (DE); Volker Riha, Nordhorn (DE); Dmitry Kuznetsov, Kassel (DE); Liubov Altunina, Tomsk (RU); Vladimir A. Kuvshinov, Tomsk (RU)

(73) Assignees: Wintershall Holding GmbH (DE); Institute of Petroleum Chemistry of the Siberian Branch of the Russian Academy (RU)

( * ) Notice: Subject to any disclaimer, the term of this patent is extended or adjusted under 35 U.S.C. 154(b) by 495 days.

(21) Appl. No.: 12/908,660

(22) Filed: Oct. 20, 2010

(65) Prior Publication Data

US 2011/0088899 A1 Apr. 21, 2011

(30) Foreign Application Priority Data

Oct. 21, 2009 (EP) .................................... 09173631

(51) Int. Cl.
*E21B 33/138* (2006.01)
*E21B 43/22* (2006.01)
*E21B 43/24* (2006.01)
*E21B 47/06* (2012.01)

(52) U.S. Cl.
USPC ................. 166/252.1; 166/250.01; 166/270; 166/272.5; 166/288; 166/292; 166/295; 166/300; 166/400

(58) Field of Classification Search
USPC ....................................................... 166/288
See application file for complete search history.

(56) References Cited

U.S. PATENT DOCUMENTS

| | | | | |
|---|---|---|---|---|
| 3,601,195 A | * | 8/1971 | Hearn ........................... | 166/288 |
| 3,669,188 A | * | 6/1972 | Coles et al. .................... | 166/270 |
| 4,640,361 A | * | 2/1987 | Smith et al. .................... | 166/288 |
| 4,804,043 A | * | 2/1989 | Shu et al. ....................... | 166/270 |
| 4,844,168 A | | 7/1989 | Sydansk | |
| 4,889,563 A | | 12/1989 | Parker et al. | |
| 4,974,677 A | * | 12/1990 | Shu ................................ | 166/270 |
| 6,838,417 B2 | | 1/2005 | Bouwmeester et al. | |
| 7,128,148 B2 | * | 10/2006 | Eoff et al. ................. | 166/250.14 |
| 7,232,101 B2 | | 6/2007 | Wanek et al. | |
| 7,273,101 B2 | | 9/2007 | Davies et al. | |
| 7,458,424 B2 | * | 12/2008 | Odeh et al. ..................... | 166/293 |
| 7,677,313 B2 | * | 3/2010 | Tremblay et al. ............. | 166/293 |
| 2008/0035344 A1 | | 2/2008 | Odeh et al. | |
| 2012/0199343 A1 | * | 8/2012 | Stehle et al. ................... | 166/246 |
| 2012/0255729 A1 | * | 10/2012 | Stehle et al. ................ | 166/270.1 |

FOREIGN PATENT DOCUMENTS

| | | |
|---|---|---|
| RU | 2 066 743 C1 | 9/1996 |
| RU | 2 339 803 C2 | 11/2008 |
| SU | 1 654 554 A1 | 6/1991 |
| WO | WO-2007/135617 A1 | 11/2007 |

* cited by examiner

*Primary Examiner* — George Suchfield
(74) *Attorney, Agent, or Firm* — Novak Druce Connolly Bove + Quigg LLP

(57) ABSTRACT

The present invention relates to a process for the production of mineral oil from mineral oil deposits with large temperature gradients, in which, for increasing the mineral oil yield, highly permeable regions of the mineral oil formation are blocked by injecting formulations which, after being forced into the deposit, form highly viscous gels under the influence of the deposit temperature. A plurality of portions of the formulation which in each case can form gels at different temperatures and therefore result in very complete blocking of highly permeable regions of the formation are used.

20 Claims, 7 Drawing Sheets

PROCESS FOR THE PRODUCTION OF MINERAL OIL

CROSS REFERENCE TO RELATED APPLICATIONS

The application claims the benefit of European application 09173631.4, filed Oct. 21, 2009, the entire disclosure of which is hereby incorporated by reference.

The present invention relates to a process for the production of mineral oil from mineral oil deposits with large temperature gradients, in which, for increasing the mineral oil yield, highly permeable regions of the mineral oil formation are blocked by injecting formulations which, after being forced into the deposit, form highly viscous gels under the influence of the deposit temperature. A plurality of portions of the formulation which in each case can form gels at different temperatures and/or after different times and result in very complete blocking of highly permeable regions of the formation are used.

In natural oil fields, mineral oil is present in cavities of porous reservoir rocks which are closed off from the Earth's surface by impermeable covering strata. In addition to mineral oil, including proportions of natural gas, a deposit further comprises water having higher or lower salt content. The cavities may be very fine cavities, capillaries, pores or the like, for example those having a diameter of only about 1 μm; in addition, however, the formation can also have regions with pores of larger diameter and/or natural fractures.

After the sinking of the well into the oil-carrying strata, the oil initially flows to the production wells under the natural deposit pressure and erupts from the Earth's surface. This phase of mineral oil production is referred to by the person skilled in the art as primary production. Under poor deposit conditions, such as, for example, a high oil viscosity, rapidly declining deposit pressure or high flow resistances in the oil-carrying strata, the flush production rapidly comes to a stop. With primary production, it is possible on average to extract only from 2 to 10% of the oil originally present in the deposit. In the case of more highly viscous mineral oils, flush production is as a rule not possible at all.

In order to increase the yield, the so-called secondary production methods are therefore used.

The most commonly used method of secondary mineral oil production is water flooding. There, water is forced into the oil-carrying strata through so-called injection wells. As a result, the deposit pressure is artificially increased and the oil is forced out of the injection wells to the production wells. The yield can be substantially increased under certain conditions by water flooding.

In water flooding, ideally a water front emanating from the injection well should force the oil uniformly over the entire mineral oil formation to the production well. In practice, a mineral oil formation has, however, regions with different flow resistance. In addition to finely porous oil-saturated reservoir rocks having a high flow resistance for water, there are also regions having low flow resistance for water, such as, for example, natural or artificial fractures or very permeable regions in the reservoir rock. Such permeable regions may also be regions from which oil has already been extracted. In water flooding, the flooding water forced in does of course flow mainly through flow paths with low flow resistance from the injection well to the production well. As a result of this, the finely porous oil-saturated deposit regions having high flow resistance are no longer flooded, and more and more water and less mineral oil is extracted via the production well. In this context, the person skilled in the art uses the term "watering down of production". Said effects are particularly pronounced in the case of heavy or viscous mineral oils. The higher the mineral oil viscosity, the more probable is the rapid watering down of production.

For production of mineral oil from deposits with a high mineral oil viscosity, the mineral oil can be heated by forcing superheated steam into the deposit and thus reducing the oil viscosity. As in the case of water flooding, however, superheated steam and condensed steam can also penetrate in an undesired manner rapidly through highly permeable zones from the injection wells to the production wells, and the efficiency of tertiary production is thus reduced.

The prior art therefore discloses measures for closing such highly permeable zones between injection wells and production wells by means of suitable measures. As a result, highly permeable zones having low flow resistance are blocked and the flooding water and the flooding steam flow again through the oil-saturated strata of low permeability. Such measures are also known as so-called "conformance control". An overview of measures for "conformance control" is given by Borling et al. *"Pushing out the oil with Conformance Control" in Oilfield Review* (1994), pages 44 et seq.

Comparatively low-viscosity formulations of certain chemical substances which can be readily forced into the formation and whose viscosity increases substantially only after forcing into the formation under the conditions prevailing in the formation can be used for "conformance control". Such formulations comprise inorganic or organic or polymeric components suitable for increasing the viscosity. The increase in the viscosity of the formulation forced in can occur firstly simply with time lag. However, there are also known formulations where the increased viscosity is triggered substantially by the temperature increase when the formulation forced into the deposit gradually heats up to the deposit temperature. Formulations whose viscosity increases only under formation conditions are known, for example, as "thermogels" or "delayed gelling system".

SU 1 654 554 A1 discloses mixtures of aluminum chloride or aluminum nitrate, urea and water, which are injected into the mineral oil formation. At the elevated temperatures in the formation, the urea hydrolyzes to carbon dioxide and ammonia. As a result of the liberation of the base ammonia, the pH of the water is substantially increased and a highly viscous aluminum hydroxide gel is precipitated, which blocks the highly permeable zones.

U.S. Pat. No. 4,889,563 discloses the use of aqueous solutions of an aluminum hydroxychloride in combination with urea or hexamethylenetetramine (urotropine) for blocking underground mineral oil formations. Here too, the hydrolysis of urea or hexamethylenetetramine in the formation leads to an increase in the pH and the precipitation of aluminum hydroxide.

RU 2 066 743 C1 discloses mixtures of aluminum chloride or aluminum nitrate, urea, urotropine and water, which are injected into the mineral oil formation and act in the manner already described. The mixtures have the advantage that they are also effective at temperatures below 60° C.

WO 2007/135617 discloses a process for blocking underground formations, in which a formulation which exhibits delayed gelling is used. The formulation comprises colloidal silica particles having a diameter from 4 to 300 nm. For gelling, the formation comprises an OH donor which releases OH groups at elevated temperatures and thus causes the formulation to gel. For example, urea, substituted ureas or hexamethylenetetramine can be used as an OH donor.

U.S. Pat. No. 7,273,101 B2 discloses a formulation with delayed gelling, which comprises dissolved metal salts, preferably aluminum salts, inorganic particles, such as, for example, silica particles, and an OH donor, such as, for example, urea. The formulation is pumped into mineral oil formations and gels only with a certain time lag in the formation.

U.S. Pat. No. 4,844,168 discloses a process for blocking sections of high-temperature mineral oil formations, in which polyacrylamide and a polyvalent metal ion, for example Fe(III), Al(III), Cr(III) or Zr(IV), are forced into a mineral oil formation having a reservoir temperature of at least 60° C. Under the conditions in the formation, some of the amide groups —$CONH_2$ hydrolyze to —COOH groups, the metal ions crosslinking the —COOH groups formed so that a gel is formed with a certain time lag.

U.S. Pat. No. 6,838,417 B2 discloses a process for blocking underground mineral oil formations, in which an aqueous formulation is used which comprises at least one water-soluble polymer, a gelling organic component which has a crosslinking effect and at least one water-soluble formate. The crosslinking organic components are, for example, polyfunctional aliphatic amines, arylalkylamines, heteroarylalkylamines or polyalkyleneimines.

US 2008/0035344 A1 discloses a mixture for blocking underground formations with delayed gelling, which comprises at least one acid-soluble, crosslinkable polymer, for example partly hydrolyzed polyacrylamide, a partially neutralized aluminum salt, for example an aluminum hydroxychloride, and an activator which can liberate bases under formation conditions, such as, for example, urea, substituted ureas or hexamethylenetetramine. The mixture can preferably be prepared at a temperature from 0 to 40° C. and gels at temperatures above 50° C. from 2 h to 10 days, depending on conditions of use.

RU 2 339 803 C2 discloses a process for blocking such highly permeable zones, in which first the volume of the highly permeable zones to be blocked is determined. Thereafter, in a first process step, an aqueous formulation of carboxymethylcellulose and chromium acetate as a crosslinking agent in 15% by volume, based on the total volume of that zone of the mineral oil formation which is to be blocked is injected. In a second step, an aqueous formulation of polyacrylamide and a crosslinking agent is injected.

L. K. Altunina and V. A. Kuvshinov in *Oil & Gas Science and Technology—Rev. IFP*. Vol. 63 (2008) (1), pages 37 to 48, describe various thermogels and their use for oil production, including thermogels based on urea and aluminum salts and thermogels based on cellulose ethers.

Mineral oil formations frequently do not have a homogeneous temperature distribution but have more or less pronounced temperature gradients. Such temperature gradients may be of natural origin or brought about artificially by measures of secondary and/or tertiary mineral oil production. Thus, the steam used for steam flooding usually has a temperature of above 300° C. Accordingly, the mineral oil formation may heat up to above 300° C. at the site of the injection well. Of course, the temperature decreases with increasing distance from the injection well, and a substantial temperature gradient can therefore build up from the injection wells to the production wells. For example, the temperature on steam flooding may be about 300° C. at the injection well while only a temperature of about 50° C. prevails at the production well. Conversely, by constantly forcing in cold flooding water, the temperature of the mineral oil formation can also decrease substantially at the injection well and increase with increasing distance from the injection well. For example, in a deposit having a deposit temperature of about 120° C., the temperature at the water injector can definitely cool to 40 to 60° C. in the case of a long injection time.

In mineral oil formations having a very inhomogeneous temperature distribution, the use of the abovementioned formulations for blocking highly permeable zones frequently leads only to insufficient blocking of the flow paths. The watering down of production is reduced but not to the extent which is economically desirable.

It was therefore an object of the invention to provide a process for the production of mineral oil from mineral oil formations having a very inhomogeneous temperature distribution, in which the watering down of production is avoided.

Accordingly, a process for the production of mineral oil from underground mineral oil deposits was found, in which at least one production well and at least one injection well have been sunk, comprising at least the following process steps:

(1) forcing aqueous, gel-forming formulations (F) through an injection well into the mineral oil deposit, the formulations (F) comprising water and one or more chemical components, which, after being forced into the deposit, form gels under the influence of the deposit temperature, followed by (2) production of oil through at least one production well, wherein the deposit in the region between the injection well and the production well has a temperature distribution with a minimum temperature $T_{min}$ of ≥20° C. and a maximum temperature $T_{max}$ of ≤320° C., the temperature difference $T_{max}-T_{min}$ being at least 20° C., in a step upstream of process step (1), the temperature distribution in the region between the injection well and the production well is analyzed, and in process step (1), at least two different portions of aqueous, gel-forming formulations (F) are injected successively into the formation, each of the portions being capable of gel formation at a temperature or in a temperature range within a span of from $T_{min}$ to $T_{max}$, and the formulations differing with respect to the type of chemical components comprised and/or their respective concentration, with the proviso that the chemical components of the formulations and/or their concentration are chosen so that the gel formation temperature ($T_{Gel}$) and/or the gel formation time ($t_{Gel}$) of the second and optionally any further injected portion differs from that of the previously injected portion.

The process according to the invention has the advantage that, in deposits having large temperature gradients, zones of different temperature can be blocked in a targeted manner by means of suitable gels. As a result, more complete blocking of highly permeable zones is achieved and the watering down of production is substantially reduced.

Regarding the invention, the following may be stated specifically:

The process according to the invention for the production of mineral oil is a process for secondary or tertiary mineral oil production, i.e. it is used after the primary mineral oil production has come to a stop owing to the autogenous pressure of the deposit, and the pressure in the deposit has to be maintained by forcing in water and/or steam.

Deposits

The deposits may be deposits of all types of oil, for example those of light or of heavy oil. In an embodiment of the invention, the deposits are heavy oil deposits, i.e. deposits which comprise mineral oil having an API gravity of less than 22.3° API. As a rule, mineral oil is extracted from such deposits by forcing in steam.

Independently of whether a heavy oil deposit is involved or not, the process according to the invention can be particularly advantageously used after initial steam flooding of the deposit.

For carrying out the process, at least one production well and at least one injection well are sunk in the mineral oil deposits. As a rule, a deposit is provided with a plurality of injection wells and with a plurality of production wells. These may be wells which have already been used in an earlier stage of mineral oil production, for example in the course of preceding water flooding or steam flooding, but the wells may also be sunk into the deposit specifically for carrying out the process according to the invention.

According to the invention, the deposit is one which has a temperature distribution with a minimum temperature $T_{min} \geq 20°$ C., preferably $\geq 30°$ C., particularly preferably $\geq 40°$ C. and, for example, $\geq 50°$ C., and a maximum temperature $T_{max} \leq 320°$ C., generally $\leq 300°$ C., preferably $\leq 280°$ C., particularly preferably $\leq 250°$ C., very particularly preferably $\leq 220°$ C. and, for example, $\leq 150°$ C., in the region between the injection well(s) and the production well(s), the temperature difference $T_{max}-T_{min}$ being at least 20° C.

The term "region between the injection well and production well" relates to those volume elements of the deposit through which flow paths lead from the injection wells to the production wells, it of course not being necessary for the flow paths to run linearly between injection well and production well. Methods enabling the determination of such volume elements through which flow takes place are known to the person skilled in the art.

The deposit can of course also have an inhomogeneous temperature distribution outside the region between the production wells and the injection wells.

The reference points for determining the "region between the injection well and production well" are of course not the production well and the injection well in their total lengths but, in the case of the injection well, that point of the well at which the formulation (F) actually enters the formation from the induction well and, in the case of the production well, that point at which crude oil enters, or is to enter in future, the production well from the formation.

The temperature differences described may be of natural origin or may be caused by measures of secondary and/or tertiary mineral oil production, such as water flooding or steam flooding. Particularly large temperature differences can be brought about by steam flooding. Steam is usually forced into the mineral oil formation at temperatures of up to 320° C. Depending on the duration of the steam injection, a mineral oil formation may have relatively large regions with a temperature of above 250° C. after the steam flooding. Of course, the temperature decreases to the "natural" deposit temperature with increasing distance from the injector. Furthermore, the deposit temperature also decreases over time after a steam injector has been switched off.

With regard to $T_{min}$ and $T_{max}$, two types of deposits can be distinguished, namely deposits from which oil was produced with the aid of water flooding, and deposits from which oil was produced with the aid of steam flooding. Deposits from which oil was produced with the aid of water flooding generally have a temperature distribution in the range from 20° C. to 150° C., preferably in the range from 20° C. to 120° C. and more preferably in the range from 30 to 110° C. and for example in the range from 40 to 100° C. (in each case from $T_{min}$ to $T_{max}$). Deposits from which oil was produced with the aid of steam flooding generally have a temperature distribution in the range from 20° C. to 300° C., preferably in the range from 30° C. to 280° C. and more preferably in the range from 40 to 250° C. and for example in the range from 50° C. to 220° C. (in each case from $T_{min}$ to $T_{max}$).

The advantages of the process according to the invention are explained in particular in the case of large temperature gradients between the injection well and the production well. The larger the temperature gradient, the better it is possible to operate by means of the process according to the invention. The advantages of the process according to the invention are particularly evident if the temperature difference $T_{max}-T_{min}$ is at least 30° C., in particular at least 40° C., preferably at least 60° C., particularly preferably at least 80° C., very particularly preferably at least 120° C. and, for example, at least 150° C.

Depending on the nature of the deposit, the process according to the invention can preferably be carried out after preceding water flooding and/or steam flooding, preferably steam flooding of the mineral oil deposit, without this being absolutely essential. In the case of such flooding processes, a flooding medium, in particular water or steam, is forced into the mineral oil deposit through at least one injection well, and crude oil is removed from the deposit through at least one production well. In this context, the term "crude oil" does not of course mean single-phase oil but means the usual emulsions which comprise oil and formation water and are extracted from mineral oil deposits. The process according to the invention can be used as soon as the production is watered down to an excessive extent. However, highly permeable zones need not necessarily be created by water or steam flooding but can of course be present in a formation.

Process

According to the invention, the process comprises at least two process steps (1) and (2) which are carried out in succession. In a first process step (1), highly permeable zones of the formation are closed by forcing aqueous, gel-forming formulations (F) into the formation. In a second process step (2), the actual mineral oil production is effected. The oil production can be effected, for example, with the use of a suitable flooding medium.

Process Step (1)

For the preparation for process step (1), the temperature distribution in the region between the injection well and the production well is analyzed. Methods for determining the temperature distribution of a mineral oil deposit are known in principle to the person skilled in the art. Said determination is carried out as a rule from temperature measurements at certain points of the formation in combination with simulation calculations, inter alia quantities of heat input into the formation and the quantities of heat removed from the formulation being taken into account in the simulation calculations. Alternatively, each of the regions can also be characterized by its average temperature. For the person skilled in the art, it is clear that the described analysis of the temperature distribution and optionally the division into a plurality of partial regions of different temperature ranges or different average temperatures is only an approximation of the actual conditions in the formation.

According to the invention, in process step (1), at least two different portions of an aqueous, gel-forming formulation (F) are injected in succession through an injection well into the mineral oil formation. The formulations (F) comprise, in addition to water, one or more different water-soluble or water-dispersible chemical components which, after the formulations are forced into the formation under the conditions prevailing in the formation, produce the gel formation. The portions used each have different gel formation temperatures $T_{Gel}$ and/or gel formation times $t_{Gel}$.

The term "gel-forming" means that the mixture can in principle form gels under certain conditions but that the gel formation does not begin immediately after the mixing of the components of the formulation but the formation of a gel is delayed and begins only on exceeding the gel formation temperature $T_{Gel}$. The formulations used therefore have a comparatively low viscosity after mixing, so that they can be forced into the formation without problems and form highly viscous gels only after said forcing into the formation under the influence of the prevailing deposit temperature, which gels can block highly permeable regions of the deposit.

It is clear for the person skilled in the art that the speed of gel formation may depend as a rule both on the time and on the temperature. The person skilled in the art can determine the gel formation temperature exactly by measuring the gel formation speed of a certain formulation as a function of the temperature, followed by an extrapolation of the measured curve to a reaction rate of zero. In a pragmatic approach, the person skilled in the art can define the gel formation temperature approximately as the onset of gel formation after a time span relevant in practice. All that is important is that, for comparison of the gel formation temperatures $T_{Gel}$ of the formulations (F) used in each case, the same method for determining the gel formation temperature is used in each case.

The injected portions of the formulation (F) may also differ with regard to the gel formation time $t_{Gel}$. This is understood as meaning the time span from heating up of the formulation to a temperature $\geq T_{Gel}$ until formation of a gel. It is therefore possible to use two gel-forming formulations having the same gel formation temperature $T_{Gel}$ but different gel formation times $t_{Gel}$. Of course, the individual portions of the gel-forming formulation may differ with regard to both $T_{Gel}$ and $t_{Gel}$.

The differences in the gel formation temperatures $T_{Gel}$ and/or $t_{Gel}$ are brought about by a different composition of the portions of the formulations (F) used. The term "different composition" is intended to mean that the formulations differ with respect to the type of chemical components comprised and/or their respective concentration. The latter necessarily means that the proportion of the components relative to one another can also differ. The type of gel-forming formulations is not important here and all that is essential is that the formulations can perform the functions according to the invention. Formulations preferred for carrying out the invention are described further below.

The formulations used are chosen by the person skilled in the art so that each of the portions forced in is capable of gel formation at a temperature, or within a temperature interval, within the range from $T_{min}$ to $T_{max}$. Generally, the gel formation temperature $T_{Gel}$ is 20° C. to 150° C., preferably 30 to 150° C. and particularly preferably 40 to 130° C.

According to the invention, the formulations are chosen so that the gel formation temperature $T_{Gel}$ and/or the gel formation time $t_{Gel}$ of the second and optionally each further injected portion differs from that of the previously injected portion. Preferably, all injected portions have a different gel formation temperature $T_{Gel}$ and/or gel formation time $t_{Gel}$. However, it is also possible for portions not forced in succession to have the same gel formation temperature $T_{Gel}$ and the same gel formation time $t_{Gel}$.

A different gel formation temperature $T_{Gel}$ and/or gel formation time $t_{Gel}$ have the effect that the at least two formulations can penetrate different distances into the formation from the injection site. As a result, high-permeability regions of the formation become closed over a comparatively large stretch and not just locally at one point. This provides far better closure of high-permeability regions.

The number of portions of gel-forming formulations forced in, the gel formation temperature $T_{Gel}$ and/or gel formation time $t_{Gel}$ thereof and the respective change in the gel formation temperature from portion to portion are chosen by the person skilled in the art according to the type of formation and the deposit conditions, in particular the temperature distribution.

In a preferred embodiment of the invention, at least two portions having different gel formation temperatures $T_{Gel}$ are used.

In an embodiment of the invention, the gel formation temperature $T_{Gel}$ of the portions may be reduced from portion to portion and, in a second embodiment of the invention, it can be increased from portion to portion.

In an embodiment of the invention, here $T_{Gel}=T_{max}$, as defined above, in the case of the first injected portion. This embodiment is particularly suitable for $T_{max} \leq 150°$ C. In a further embodiment, $T_{Gel}<T_{max}$ in the case of the first injected portion.

The change in the gel formation temperature $T_{Gel}$ can take place stepwise. In an embodiment of the invention, it can be reduced stepwise and in a further embodiment of the invention it can be increased stepwise.

However, it is also possible for the change in $T_{Gel}$ to take place continuously. It can be increased continuously or preferably reduced continuously. For the continuous change in the gel formation temperature, the composition of the gel-forming formulation is changed continuously. This can preferably be effected directly at the well head.

The two possibilities can also be combined with one another. Thus, the injection process may comprise at least one phase with continuous variation of $T_{Gel}$, at least one further portion of the formulation (F) whose $T_{Gel}$ remains unchanged being injected before and/or after this phase. Of course, the phase before and/or after the continuous variation of $T_{Gel}$ may comprise a stepwise variation of the gel formation temperature. In a preferred variant of the invention, the injection process comprises at least one phase with a continuous decrease in the gel formation temperature $T_{Gel}$, at least one further portion of the formulation (F) whose $T_{Gel}$ remains unchanged being injected before and/or after this phase.

The change in the gel formation time $t_{Gel}$ can likewise take place continuously or with a stepwise increase or decrease. The change in the gel formation time $t_{Gel}$ is advantageous in particular when the deposits involved are those in which the temperature difference $T_{max}-T_{min}$ is not too great. Under these conditions, in the case of two portions of the same gel formation temperature $T_{Gel}$, that having the greater gel formation time $t_{Gel}$ can flow substantially further into the formation than the portion having the shorter gel formation time $t_{Gel}$.

In a preferred embodiment of the invention, the ratio of the volumes of the portions of the formulation (F) which are to be forced in is adapted in a targeted manner according to the conditions in the formation. Here, on the basis of the analysis of the temperature distribution, the region between the injection well and the production well is divided into at least two partial regions, each of the partial regions n having a certain temperature range with a maximum temperature $T_{max(n)}$ and a minimum temperature $T_{min(n)}$, where $T_{max(n)} \leq T_{max}$ and $T_{min(n)} \geq T_{min}$, i.e. each of the partial regions is within the partial range from $T_{max}$ to $T_{min}$. The temperature distribution of each partial region can of course also be characterized by an average temperature. Each partial region has a certain cavity volume. The cavity volume in each partial region can be determined approximately, for example, by measurements in combination with simulation calculations and is otherwise at least roughly estimated by the person skilled in the art. According to the invention, a number of portions of the formulation (F) having in each case a different $T_{Gel}$ which corresponds to the number of partial regions is injected, the ratio of the volumes of the portions to be forced in being chosen according to the ratio of the cavity volumes of the partial regions described.

In a further embodiment of the invention, the viscosity of the gel-forming formulations (F) can be changed in a targeted manner from portion to portion. What is meant here is the viscosity of the gel-forming formulation before injection into the formation, i.e. before the gel formation. Preferably, the viscosity can be increased from portion to portion. This reduces the danger that different injected portions mix with one another in the formation and the effect of the process is adversely affected thereby. Furthermore, the so-called "fingering" can be thereby reduced.

The injection of the individual portions of the formulation (F) can be effected directly in succession, i.e. without interruption of the forcing in of the formulations (F).

However, it is also possible to interrupt the injection of the individual portions by a pause in which no formulation (F) is forced in. During the interruption, it is firstly possible for no action to take place at all, but alternatively it is also possible to inject a flooding medium, in particular water and/or steam, during the total time of the interruption or only a part thereof. After the last portion of the formulation (F) has been forced in, subsequent flooding can also be effected with water and/or steam, for example in order to transport the forced-in formulation (F) to the desired location in the formation.

The injection of the formulations (F) can be effected through an injection well which was drilled specifically for injecting the formulations. Of course, a plurality of injection wells may also be present. Such a well can preferably be drilled in a zone having a temperature $T<T_{max}$, particularly preferably in a zone close to $T_{min}$. The forcing in of the formulation having the highest gel formation temperature can particularly advantageously be begun through such an injection well in a comparatively cold zone and the gel formation temperature can then be decreased in each case from portion to portion.

However, it is also possible to use an already present injection well, which was used for preceding water and/or steam flooding, for injecting the portions of the formulations (F). While this as a rule presents no problems where process step (1) follows water flooding, it may require particular precautions where steam is injected in the preceding step. In such a case, the zone around the steam injector is in fact very hot. If it is desired that the injected portions gel only in zones further away from the steam injector, it is advisable to use formulations which have a relatively long delay time to gelling and to force the formulations very rapidly through the hot zone around the steam injector. Of course, the zone around the steam injector can first be allowed to cool somewhat. Such cooling can optionally also be accelerated by forcing in water. When the injection is through a steam injector, the hot zone around the steam injector preferably has a temperature of no more than 250° C., preferably no more than 220° C.

Process Step (2)

After process step (1), the oil production is continued through at least one production well.

Preferably, the oil production can be effected by customary methods by forcing a flooding medium through at least one injection well into the mineral oil deposit and removing crude oil through at least one production well. The flooding medium may be in particular carbon dioxide, water and/or steam, preferably steam. The at least one injection well may be the injection wells used for injecting the formulations (F) or suitably arranged other injection wells.

However, the oil production can of course also be continued by means of other methods known to the person skilled in the art. For example, microorganisms which develop methane or carbon dioxide in the formation can be used and the pressure can be maintained in this manner. Furthermore, highly viscous solutions of thickening polymers can be used as flooding medium. These may be synthetic polymers, such as, for example, polyacrylamide or copolymers comprising acrylamide. Furthermore, they may be biopolymers, such as, for example, certain polysaccharides.

Preferred Formulations

The aqueous, gel-forming formulations (F) comprise, in addition to water, one or more different water-soluble or water-dispersible chemical components which are responsible for the gel formation. These are preferably at least two different components. They may be both inorganic components and organic components and of course also combinations of inorganic and organic components.

The type of gel-forming formulations (F) is in principle irrelevant in this case. What is essential is that the formulations used can form gels and have different $T_{Gel}$ and/or $t_{gel}$, so that different regions in the underground formation can be closed by the gel.

Suitable formulations and techniques for varying $T_{Gel}$ and/or $t_{gel}$ are known in principle to those skilled in the art.

For example, they may be formulations based on water-soluble polymers, as disclosed, for example, in U.S. Pat. Nos. 4,844,168, 6,838,417 B2 or US 2008/0035344 A1, or formulations substantially based on inorganic components, as disclosed, for example, in SU 1 654 554 A1, U.S. Pat. No. 4,889,563, RU 2 066 743 C1, WO 2007/135617, U.S. Pat. No. 7,273,101 B2 or RU 2 339 803 C2. Suitable formulations are also commercially available.

The gel formation temperature $T_{Gel}$ of formulations (F) used is generally in the range from 20° C. to 150°, preferably in the range from 30 to 150° C. and more preferably in the range from 40 to 130° C. When hotter zones in a formation are to be blocked, it is advisable to increase the gel formation time $t_{Gel}$ of the gels used. This can be done for example by diluting the formulations to a greater extent or by changing the ratio of the components relative to each other. Details are described hereinbelow. A longer gel formation time $t_{Gel}$ means that it takes longer for the formulation used to gel after reaching a hot zone, and so the formulation can penetrate further into the hot zone.

In a preferred embodiment, the formulation (F) is an acidic aqueous formulation which comprises at least
  water,
  a metal compound which is dissolved therein and can form gels on addition of bases, and
  a water-soluble activator which brings about an increase in the pH of the aqueous solution at a temperature $T \geq T_{Gel}$.

In addition to water, the formulation can optionally also comprise further organic solvents miscible with water. Examples of such solvents comprise alcohols. As a rule, the formulations (F) should, however, comprise at least 80% by weight of water, based on the sum of all solvents of the formulation, preferably at least 90% by weight and particularly preferably at least 95% by weight. Very particularly preferably; only water should be present.

The dissolved metal compounds are preferably aluminum compounds, in particular dissolved aluminum(III) salts, such as, for example, aluminum chloride, aluminum nitrate, aluminum sulfate, aluminum acetate or aluminum acetylacetonate. However, they may also be aluminum salts which are already partly hydrolyzed, such as, for example, aluminum hydroxychloride. Of course, mixtures of a plurality of different aluminum compounds may also be used. The pH of the formulation is as a rule ≤5, preferably ≤4.5.

Suitable water-soluble activators are all compounds which, on heating to a temperature $T>T_{Gel}$ in an aqueous medium, release bases or bind acids and hence ensure an increase in the pH of the solution. By increasing the pH, highly viscous, water-insoluble gels which comprise metal ions, hydroxide ions and optionally further components form. In the case of the use of aluminum compounds, an aluminum hydroxide or aluminum oxide hydrate gel may form, which of course may also comprise further components, such as, for example, the anions of the aluminum salt used. For example, urea, substituted ureas, such as N,N'-alkylureas, in particular N,N'-dimethylurea, hexamethylenetetramine (urotropin) or cyanates can be used as water-soluble activators. Urea for example hydrolyzes in an aqueous medium to give ammonia and $CO_2$. Of course, mixtures of a plurality of different activators may also be used.

The formulations may comprise yet further components which can accelerate or decelerate gel formation: Examples comprise further salts or naphthenic acids.

The concentrations of the metal compounds used are chosen by the person skilled in the art so that a gel having the desired viscosity forms. He will therefore use the activator in a concentration such that a sufficient amount of base can form in order to lower the pH to such an extent that a gel can actually be precipitated. Furthermore, the gel formation time $t_{Gel}$ can also be determined via the amounts or the ratios. The higher the concentration of the activator, the greater is the speed of gel formation—at a given concentration of the metal compound. The person skilled in the art can make use of this relationship in order to accelerate or to slow down the gel formation time $t_{Gel}$ in a targeted manner. Slowing down the speed of formation can be important, for example, when—as described above—it is first intended to pass through a hot zone without a gel forming. The speed of gel formation after exceeding $T_{Gel}$ is of course also determined by the temperature prevailing in the formation. In the case of aluminum, an amount of from 0.2 to 3% by weight of aluminum(III), based on the aqueous formulation, has proven useful. The amount of the activator should be at least such that 3 mol of base are released per mole of Al(III).

Table 1 below shows by way of example the time to gel formation for a mixture of 8% by weight of $AlCl_3$ (calculated as anhydrous product, corresponds to 1.6% by weight of Al(III)), 25% by weight of urea and 67% by weight of water.

TABLE 1

| Time to gel formation at different temperatures | | | | | |
|---|---|---|---|---|---|
| Temperature [° C.] | 100 | 90 | 80 | 70 | 60 |
| Gel formation time [days] | ¼ | 1 | 3 | 6 | 30 |

Table 2 below shows the time to gel formation for various mixtures of $AlCl_3$ (calculated as anhydrous product), urea and water at 100° C. or 110° C.

TABLE 2

| Time to gel formation | | | | |
|---|---|---|---|---|
| | Amounts used | $AlCl_3$/urea | Time to gel formation (h) | |
| | [% by weight] | weight ratio | 100° C. | 110° C. |
| $AlCl_3$ | 4 | 1:4 | 4.0 | — |
| Urea | 16 | | | |
| $AlCl_3$ | 4 | 1:3 | 4.3 | — |
| Urea | 12 | | | |
| $AlCl_3$ | 4 | 1:2 | 7.3 | — |
| Urea | 8 | | | |
| $AlCl_3$ | 4 | 1:1 | 19.0 | — |
| Urea | 4 | | | |
| $AlCl_3$ | 8 | 1:3.75 | 5.3 | 2 |
| Urea | 30 | | | |
| $AlCl_3$ | 2 | 1:3.75 | — | 8 |
| Urea | 7.5 | | | |
| $AlCl_3$ | 8 | 1:3 | 5.5 | — |
| Urea | 24 | | | |
| $AlCl_3$ | 8 | 1:2 | 8.3 | — |
| Urea | 16 | | | |
| $AlCl_3$ | 8 | 1:1 | 18.0 | — |
| Urea | 8 | | | |
| $AlCl_3$ | 8 | 1:0.75 | 23.0 | — |
| Urea | 6 | | | |

("—" no measurement)

It is evident that, with the decreasing amount of the activator urea, the time to formation of the gel becomes increasingly long with decreasing amount of urea, both for the series with 8% by weight of $AlCl_3$ and for the series with 4% by weight of $AlCl_3$. The gel formation time can thus be varied in a controlled manner via the aluminum salt/urea ratio.

The recited gels based on aluminum salts and urea can also be used at higher temperatures. L. K. Altunina and V. A. Kuvshinov in *Oil & Gas Science and Technology—Rev. IFP*, Vol. 63 (2008) (1), pages 37 to 48 present in FIG. 2, page 39 measurements for a gel-forming formulation of aluminum salts and urea at higher temperatures. Gel formation commences after 40 min at 150° C., after 20 min at 200° C. and after 10 min at 250° C.

Gel-forming formulations particularly useful for low deposit temperatures are obtainable by replacing some or all of the urea used as activator by urotropin (hexamethylenetetramine) as activator. Urotropin likewise releases ammonia under deposit conditions. Gel-forming formulations of this type also lead to gel formation at temperatures below 50° C. Typical aqueous formulations may comprise from 4% to 16% by weight of urea, from 2% to 8% by weight of urotropin and also from 2% to 4% by weight of aluminum chloride or nitrate (reckoned as anhydrous salt) and also water or to be more precise salt water. Formulations of this type are disclosed in RU 2 066 743 C1 for example. Table 3 hereinbelow collates some formulations disclosed in RU 2 066 743 C1 pages 5 to 7 and their gel formation at various temperatures.

U.S. Pat. No. 7,232,101 B2 discloses gel-forming formulations comprising aluminum hydroxychlorides as metal compounds and the abovementioned activators, for example urea. They make it possible to achieve gel formation at 45° C. to 140° C. with gel formation times of 12 to 96 h.

The described preferred formulations based on dissolved metal compounds, in particular aluminum salts, and activators have the advantage that inorganic gels are formed. The gels are stable up to temperatures of 300° C. and are therefore very particularly suitable for deposits having very high temperatures, such as deposits at the end of steam flooding. Furthermore, the inorganic gels can, if required, also be very easily removed again from the formation by injecting acid into the formation and dissolving the gels.

TABLE 3

Gel formation as function of temperature and time

| | | | Viscosity η before heating [MPa·s] | Temperature | | | | | | | |
|---|---|---|---|---|---|---|---|---|---|---|---|
| | | | | 20° C. | | 50° C. | | 70° C. | | 90° C. | |
| No. | Components | % by weight | | Gel formation time $t_{Gel}$ [days] | η [MPa·s] | $t_{Gel}$ [days] | η [MPa·s] | $t_{Gel}$ [days] | η [MPa·s] | $t_{Gel}$ [days] | η [MPa·s] |
| 1 | Urea | 16.0 | | | No gel formation | | No gel formation | | | | |
| | $AlCl_3$ | 4.0 | 2.4 | 100 | | 27 | | 4 | 3240 | | |
| 2 | Urea | 16.0 | | | | | | | | | |
| | $AlCl_3$ | 4.0 | | | | | | | | | |
| | Urotropin | 8.0 | 2.4 | 3 | 6960 | 1 | 4980 | 0.5 | 2500.0 | 0.5 | 2700 |
| 4 | Urea | 16.0 | | | | | | | | | |
| | $AlCl_3$ | 4.0 | | | | | | | | | |
| | Urotropin | 6.0 | 1.5 | 2 | 1830 | 3 | 4100 | 1 | 2100.0 | 1 | 2800.0 |
| 8 | Urea | 16 | | | | | | | | | |
| | $AlCl_3$ | 2.0 | | | | | | | | | |
| | Urotropin | 8.0 | 2.0 | 7 | 374.0 | 3 | 3870 | 1 | 2100.0 | 0.5 | 1200.0 |
| 9 | Urea | 16 | | | | | | | | | |
| | $AlCl_3$ | 4.0 | | | | | | | | | |
| | Urotropin | 4.0 | 1.5 | 7 | 1300.0 | 2 | 3500 | | | | |
| 5 | Urea | 8.0 | | | | | | | | | |
| | $AlCl_3$ | 4.0 | | | | | | | | | |
| | Urotropin | 8.0 | 1.6 | 2 | 3210 | 2 | 6100 | 1 | 2870.0 | 0.5 | 2900.0 |
| 7 | Urea | 8.0 | | | | | | | | | |
| | $AlCl_3$ | 2.0 | | | | | | | | | |
| | Urotropin | 4.0 | 1.6 | 4 | 600.0 | 4 | 6050 | 1 | 2200.0 | 1 | 2300.0 |
| 6 | Urea | 6.0 | | | | | | | | | |
| | $AlCl_3$ | 4.0 | | | | | | | | | |
| | Urotropin | 8.0 | 1.5 | 2 | 1830 | 2 | 4100 | 1 | 2500.0 | 1 | 5800.0 |
| 3 | Urea | 4.0 | | | | | | | | | |
| | $AlCl_3$ | 4.0 | | | | | | | | | |
| | Urotropin | 8.0 | 1.4 | 7 | 2960 | 2 | 3790 | 1 | 2310.0 | 1 | 2300.0 |

In a second preferred embodiment, formulation (F) is an aqueous formulation comprising at least
water,
colloidal silicon compounds,
a water-soluble activator which produces an increase in the pH of the aqueous solution at a temperature $T \geq T_{Gel}$.

Colloidal silicon compounds comprise more particularly colloidal $SiO_2$ which advantageously should have an average particle size in the range from 4 nm to 300 nm. The specific surface area of the $SiO_2$ can be in the range from 100 to 300 $m^2/g$ for example. Thermal activators used to raise the pH may comprise the activators already mentioned above, the urea being an example. Suitable formulations may comprise from 15% to 70% by weight of colloidal $SiO_2$ and also from 0.1% to 10% by weight of the thermal activator.

WO 2007/135617 discloses suitable formulations based on colloidal $SiO_2$. A series of measurements carried out with a gel-forming formulation comprising a dispersion of 40% by weight of $SiO_2$ (12 nm average particle size, 227 $m^2/g$, pH 9.5) and also N,N'-dimethylurea activator at a temperature of 127° C. is reported on pages 10 to 12. The series of measurements involving various concentrations of the activator are summarized in Table 4 which follows.

TABLE 4

Gel formation time at 127° C. as a function of activator concentration

| Activator concentration [% by weight] | 1 | 1.5 | 1.75 | 2 | 3 |
|---|---|---|---|---|---|
| $t_{gel}$ | 10.5 h | 7.5 h | 5.5 h | 4.5 h | 2 h |

In a third preferred embodiment, the gel-forming formulations comprise at least
water,
a water-soluble, crosslinkable polymer,
water-soluble crosslinking components which effect a crosslinking of the polymer at a temperature $T \geq T_{Gel}$.

The polymers may comprise for example polyacrylamide, partially hydrolyzed polyacrylamide, poly(N,N'-dimethyl)acrylamide, poly(meth)acrylic acid and also poly(meth)acrylic acid copolymers, partially neutralized polyacrylonitrile or poly(2-hydroxyethyl) (meth)acrylate, and each of the polymers mentioned may further comprise comonomers. Gel-forming formulations comprising polymers of this type are disclosed for example in U.S. Pat. Nos. 4,884,168, 6,838, 417 B2 or US 2008/0035344.

Crosslinking components comprise more particularly salts with at least divalent metal ions.

Preference is given to polymers comprising acrylamide, N-methylacrylamide and also N,N'-dimethylacrylamide as monomers and also optionally yet further comonomers such as acrylic acid for example. Polyacrylamide, poly-N-methylacrylamide or poly(N,N'-dimethyl)acrylamide and also partially hydrolyzed derivatives thereof may be concerned for example. By way of crosslinking components, the formulations preferably comprise salts or complexes with at least divalent metal ions, more particularly tri- or tetravalent ions, more particularly salts or complexes of $Al^{3+}$, $Fe^{3+}$, $Cr^{3+}$ or $Ti^{4+}$, for example in the form of chlorides or acetates. $AlCl_3$ or chromium acetate may be concerned for example.

The amide groups can hydrolyze at temperatures above 60° C. to form carboxyl groups. The carboxyl groups form complexes with the metal ions and thereby effectuate the crosslinking of the polymers, which results in gel formation.

U.S. Pat. No. 4,844,168 discloses in Example III an aqueous crosslinking formulation composed of 5% by weight of unhydrolyzed polyacrylamide ($M_w$ 270000 g/mol) and also 0.15% by weight of $Cr^{3+}$ (as chromium(III) acetate). Gel formation of the formulation was measured at various temperatures and times. No gel formation occurred at temperatures up to 60° C. At 74° C. a certain amount of gelling occurs after 800 h but no firm gel is obtained as yet. At 85° C. it takes 600 h to obtain a firm gel, and at 104° C., 48 h.

A person skilled in the art will make his or her selection of a suitable formulation from the known gel-forming formulations according to the properties of the subterranean formation, more particularly the temperature distribution. If it turns out to be necessary to adapt $T_{Gel}$ and $t_{Gel}$ to the formation, a person skilled in the art would be easily able to do this on the basis of the prior art.

The invention is illustrated in more detail below by way of example with reference to the figures.

Figure 1:
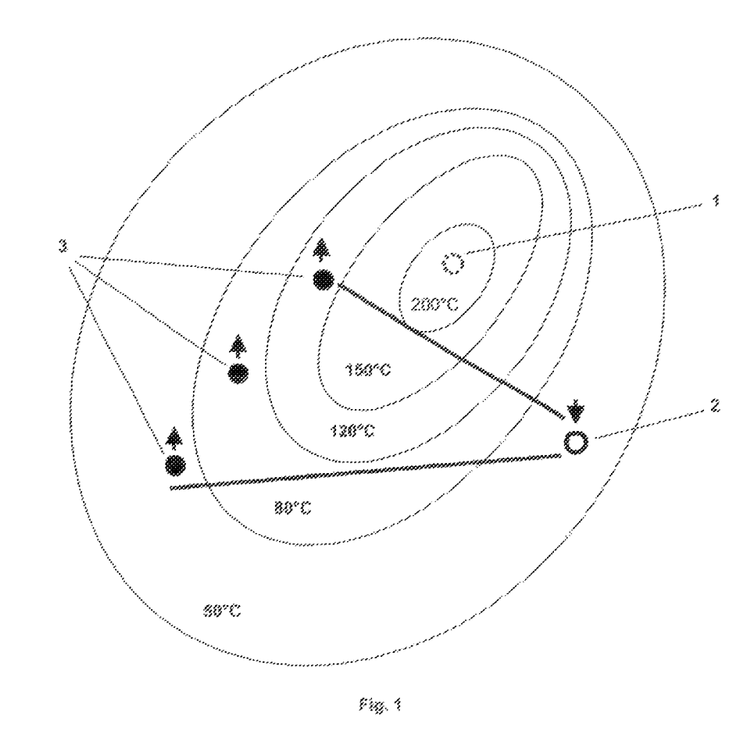
FIG. 1 Schematic diagram of a section of a mineral oil deposit after steam flooding FIG. 2 Schematic diagram of the section after injection of a first portion of a gel-forming formulation (F)

FIG. 1 schematically shows a section of a mineral oil deposit after the end of a first steam flooding process. The deposit is provided with a steam injector (1) and a plurality of production wells (3). Hot steam is forced into the formation by the steam injector (1) (steam temperature up to 320° C.) and oil is produced through the production wells (3). By means of the hot steam, the deposit heats up to a considerable extent starting from the steam injector (1). Zones of greatly different temperature form; 5 zones having average temperatures of 200° C., 150° C., 120° C., 80° C. and 50° C. are shown schematically. The highest temperatures naturally prevail in the immediate vicinity of the steam injector but decrease with increasing distance from the steam injector. Since highly permeable regions through which steam or water can break through to the production wells form with increasing duration of the steam flooding, the production becomes increasingly watered down. The temperature distribution achieved also changes only very slowly after the end of the steam injection. In the environment of steam injectors, substantially increased temperatures compared with the original, average deposit temperature may prevail under certain circumstances for many years.

In order to mobilize remaining oil reserves, a further injection well (2) may be sunk into the formation. Flooding with water and optionally steam can initially be effected through this injection well. Since no highly permeable regions were formed along the flood path from (2) to the production wells (3) by the production, it is possible here as a rule initially to mobilize further oil reserves. However, after a certain time, the flooding medium does as a rule break through newly formed highly permeable zones and in particular through highly permeable zones originating from the injection through the steam injector (1). This results in a further increase in the watering down of production.

Figure 3:
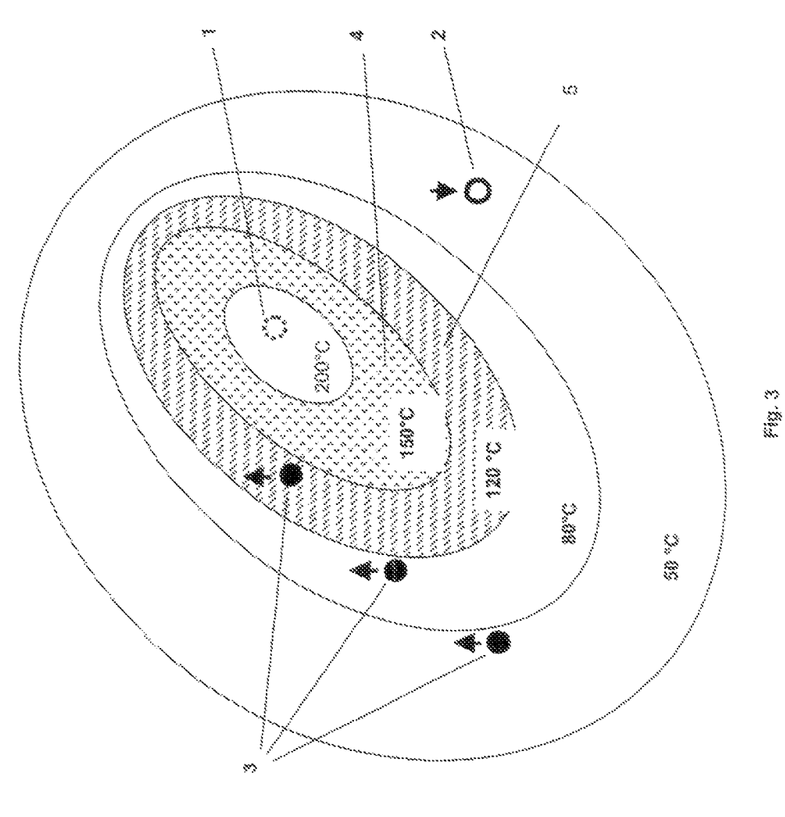
FIG. 3 Schematic diagram of the section after injection of a second portion of another gel-forming formulation (F)
Figure 4:
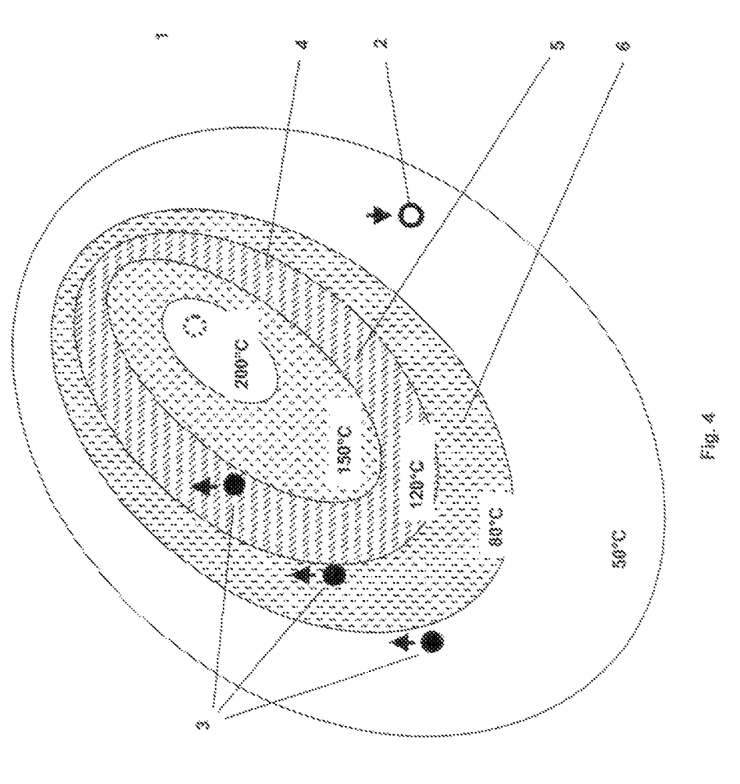
FIG. 4 Schematic diagram of the section after injection of a third portion, changed again, of a gel-forming formulation (F)

In order to reduce the watering down of production and to increase the oil extraction, the highly permeable zones of the mineral oil-carrying formation are blocked by means of the process according to the invention. For this purpose, a plurality of different portions of the gel-forming formulation (F) are forced through the injection well (2) into the formation. This is shown schematically for a first, second and third portion in FIGS. 2, 3, 4.

Figure 2:
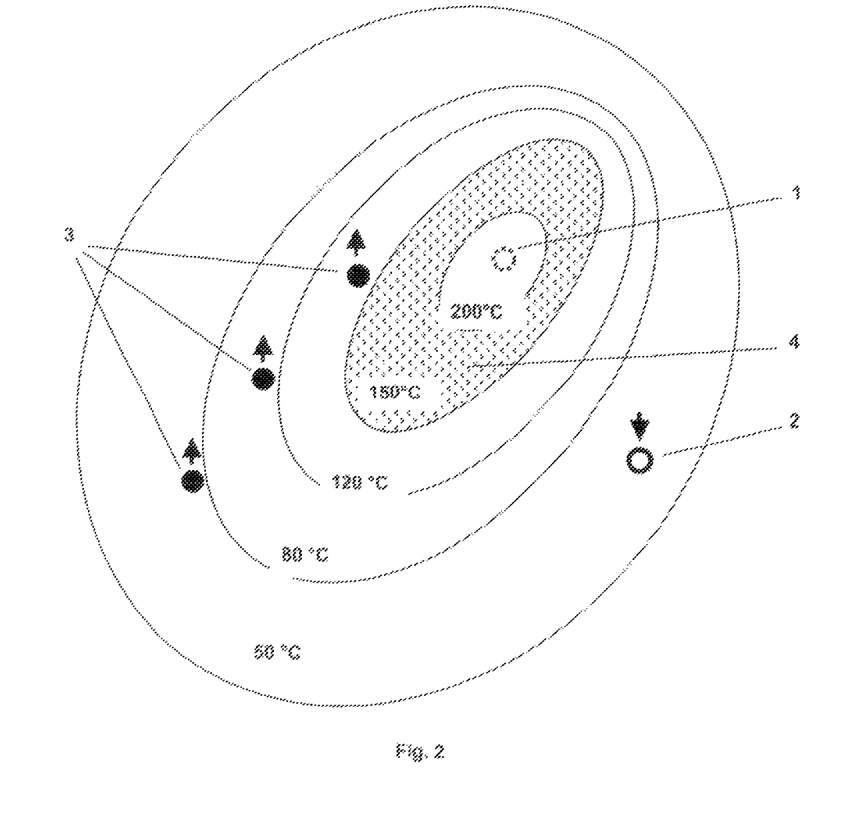

Prior to the forcing in of a first portion, the temperature distribution in the region between the injection well (2) and the production wells (3) is analyzed. This is effected by direct measurements in combination with simulation calculations. Three partial regions of different temperature are defined.

Figure 5:
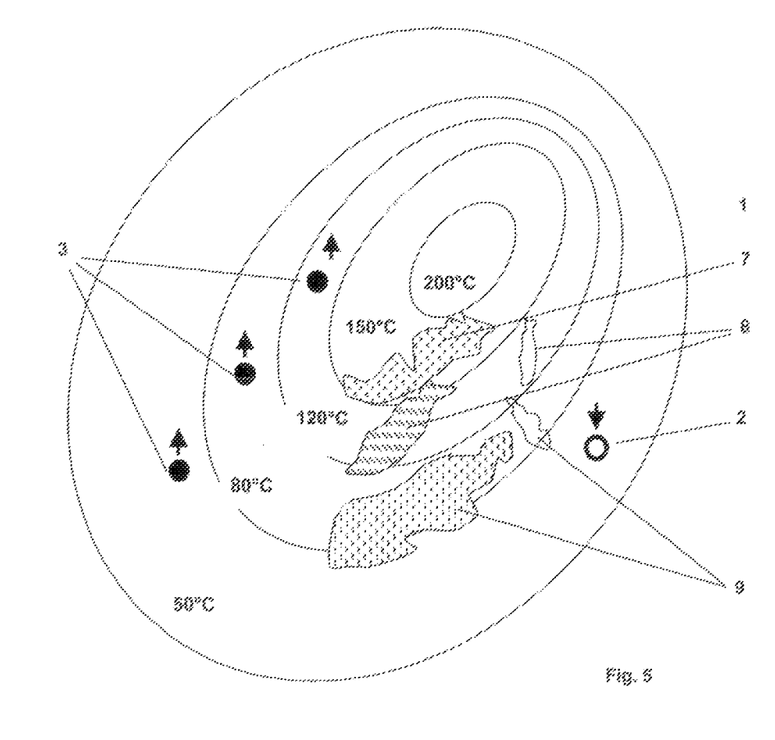
FIG. 5 Schematic diagram of the section after the blocking of highly permeable zones in the various temperature zones by the gels formed.

The gel formation temperature $T_{Gel}$ of the first portion of the formulation (F) is established according to the $T_{max}$ in the region between the injection well (2) and the production wells (3): in the present case, $T_{Gel}$ of the first portion is approximately 150° C. so that the first portion flows through the permeable regions of the zones having temperatures below 150° C. into the high-temperature zone (4) having a temperature of 150° C., where the gel formation begins. This is shown schematically in FIG. 2. $T_{Gel}$ can also be slightly lower and be compensated by a longer $t_{Gel}$. The volume of the first portion is adapted to the cavity volume of the first partial region. In the high-temperature zone, too, the formulation does of course flow into the zones having high permeability. As a result, the highly permeable zones in the high-temperature zone (4) are at least partly closed. FIG. 5 schematically shows a region (7) in the high-temperature zone (4) which is now completely or at least partly closed by a gel.

Thereafter, a second portion of the formulation (F) is prepared, the gel formation temperature $T_{Gel}$ of which corresponds to the temperature in the zone of next lowest temperature (5); in the present case, $T_{Gel}$ of the second portion is approximately 120° C. This gel, too, initially flows through the colder zone and forms gels in the highly permeable regions of the medium-temperature zone (5). This is shown schematically in FIG. 3. FIG. 5 furthermore schematically shows two regions (8) in the medium-temperature zone (5) which are now completely or at least partly closed by a gel.

In an analogous manner, a third portion of the formulation (F) is then prepared, the gel formation temperature $T_{Gel}$ of which corresponds to the temperature in the low-temperature zone (6); in the present case. $T_{Gel}$ of the third portion is approximately 80° C. This is shown schematically in FIG. 4. FIG. 5 furthermore schematically shows two regions (9) in the low-temperature zone (6) which are now completely or at least partly closed by a gel.

FIG. 5 shows that the highly permeable regions in the region between the injection well (2) and the production wells (3) are now closed, in particular in a plurality of temperature zones.

The mineral oil production can now be continued, for example, by forcing in a flooding medium, in particular steam and/or water, through the injection well (2) and/or (1). The steam now cannot flow through the blocked zones (7), (8) and (9) but is forced to pass along flow paths around the blocked zones or between the blocked zones. These zones have not yet been subjected to oil extraction and oil can now be extracted from them by means of the water and/or the steam.

The process according to the invention has the advantage that, in the case of mineral oil formations which have pronounced temperature gradients, in particular formations after a steam flooding process, particularly complete closure of highly porous regions is achieved by injecting a plurality of portions of a gel-forming formulation with different gel formation temperatures, because highly porous regions in different temperature zones can be blocked. This effect is particularly readily evident in FIG. 5. After the blocking of the porous zones in the temperature regions having an average temperature of 150° C., 120° C. and 80° C., a flooding medium injected through the injection well (2) or (1) is efficiently passed into regions from which oil has not yet been extracted.

If flooding were to have been effected only with a single portion of the formulation (F), for example that having a $T_{Gel}$ of 140° C., only the zone (7) would have been blocked, whereas the highly permeable regions in the other temperature zones would not have been closed. A flooding medium injected through (2) would in this case pass through the highly permeable but non-blocked zones (9) very rapidly in the direction of the production wells (3) without flowing through the surrounding zones from which oil has not been extracted.

Figure 6:
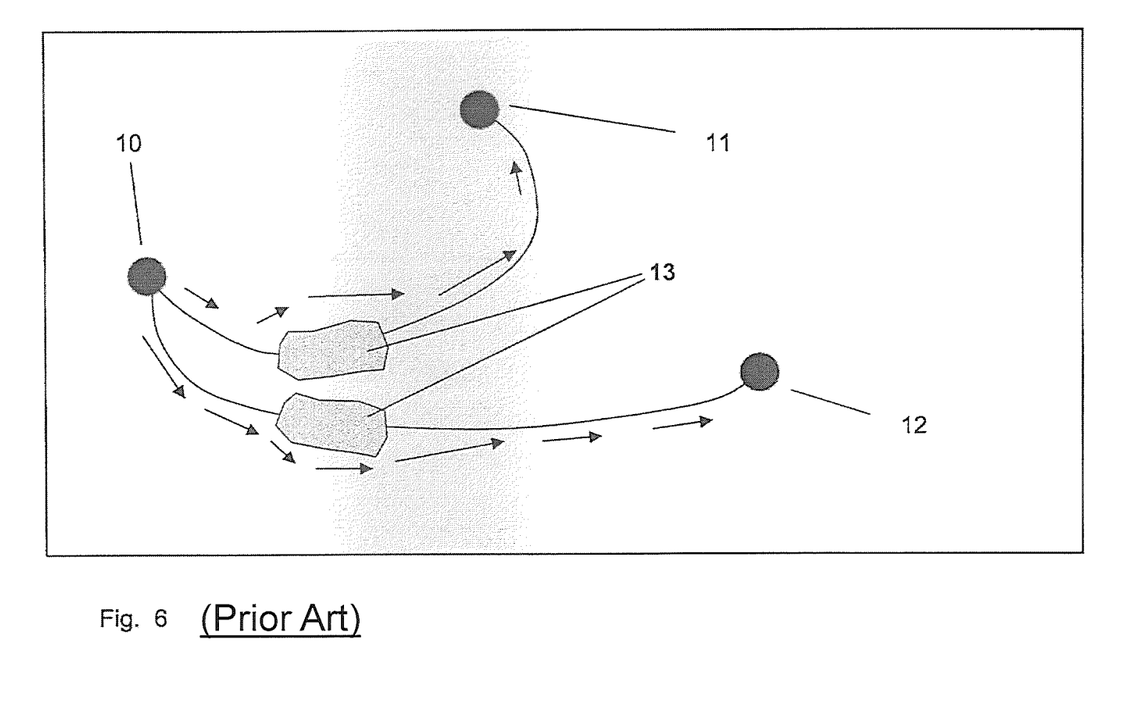
FIG. 6 Schematic diagram of the blocking of highly permeable zones of a formation having a large temperature gradient according to prior art.
Figure 7:
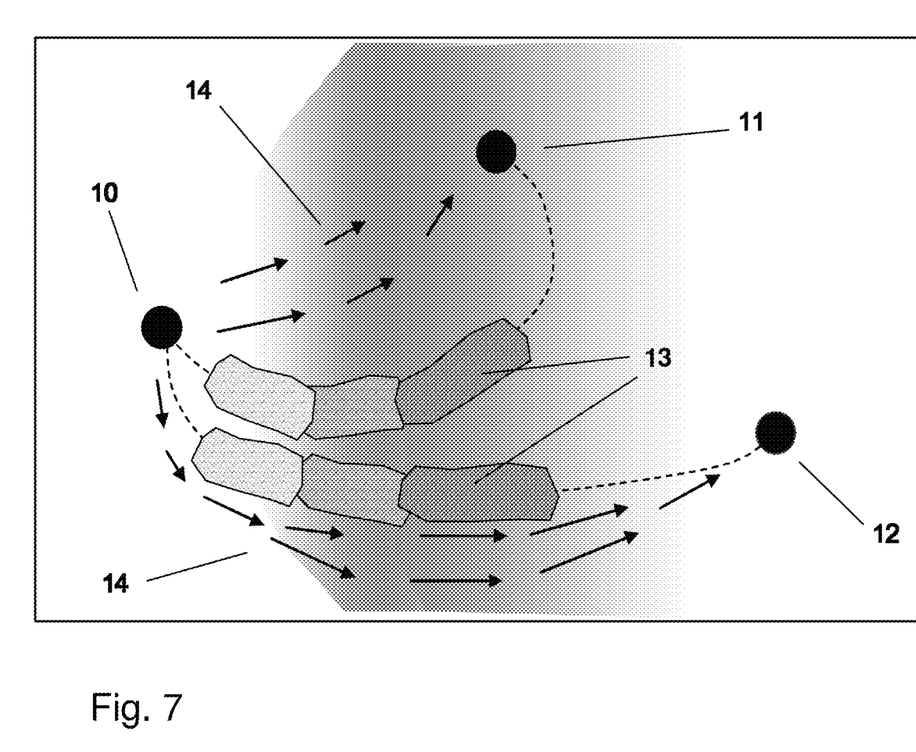
FIG. 7 Schematic diagram of the blocking of highly permeable zones of a formation having a large temperature gradient by the process according to the invention.

A comparison of the process according to the invention with a process according to the prior art is shown by way of example in FIGS. 6 and 7. The figures show in each case an injection well 10 and in each case two production wells 11 and 12. The temperature increases from the injection well to the production wells (gray shading), the production well 11 being in a very hot zone and the production well 12 once again in a cooler zone. The temperature therefore increases continuously from 10 to 11 while it passes through a maximum from 10 to 12. Highly permeable zones through which the flooding medium preferably flows have already formed between the injection well and the production wells.

In the process according to the prior art (FIG. 6), a portion of a thermogel is injected into the highly permeable zone so that, on reaching the hotter zones, a gel bank 13 forms, by means of which the flow path for the flooding medium is blocked. The flooding medium now flows around the resulting gel banks but then flows very rapidly again into the existing highly permeable zones which have not been closed and flows through these to the production wells 11 and 12. The watering down of production therefore increases rapidly again after a certain time.

In the example of the process according to the invention (FIG. 7), first a portion having a high $T_{Gel}$ is injected, which portion gels on reaching the hottest zone. Thereafter, two further portions having in each case lower $T_{Gel}$ are injected, with the result that two further gel banks form, in each case closer to the production well. By using 3 portions of the gel-forming formulation with in each case decreasing gel formation temperature, the preferred flow paths are blocked over a much greater length than is the case in the process according to the prior art. The flooding medium can no longer so easily flow around these blocked zones, as in FIG. 6, and mineral oil is now forced via completely new paths (14) in the direction of the production wells. The watering down of production is reduced to a much greater extent and more permanently on injection of only a single portion of a gel-forming formulation.

We claim:

1. A process for the production of mineral oil from underground mineral oil deposits in which at least one production well and at least one injection well have been sunk, comprising at least the following process steps:

(1) forcing aqueous, gel-forming formulations (F) through an injection well into the mineral oil deposit, the formulations (F) comprising water and one or more chemical components, which, after being forced into the deposit, form gels under the influence of the deposit temperature, followed by (2) production of oil through at least one production well, wherein the deposit in the region between the injection well and the production well has a temperature distribution with a minimum temperature $T_{min}$ of $\geq 20°$ C. and a maximum temperature $T_{max}$ of $\leq 320°$ C., the temperature difference $T_{max}-T_{min}$ being at least 20° C., in a step upstream of process step (1), the temperature distribution in the region between the injection well and the production well is analyzed, and in process step (1), at least two different portions of aqueous, gel-forming formulations (F) are injected successively into the formation, each of the portions being capable of gel formation at a temperature or in a temperature range within a span of from $T_{min}$ to $T_{max}$, and the formulations differing with respect to the type of chemical components comprised and/or their respective concentration, with the proviso that the chemical components of the formulations and/or their concentration are chosen so that the gel formation temperature ($T_{Gel}$) and/or the gel formation time ($t_{Gel}$) of the second and optionally any further injected portion differs from that of the previously injected portion.

2. The process according to claim 1, wherein $T_{max} \leq 250°$ C.

3. The process according to claim 2, wherein the gel formation temperature $T_{Gel}$ of the formulations used is 20° C. to 150° C.

4. The process according to claim 1, wherein the gel formation temperature $T_{Gel}$ of the formulations used is 20° C. to 150° C.

5. The process according to claim 1, wherein $T_{Gel}$ of the portions is reduced from portion to portion.

6. The process according to claim 5, wherein the change in $T_{Gel}$ takes place stepwise.

7. The process according to claim 5, wherein the change in $T_{Gel}$ takes place continuously.

8. The process according to claim 5, wherein the injection process comprises at least one phase with continuous variation of $T_{Gel}$, with the proviso that, before and/or after this phase, at least one further portion of the formulation (F) is injected, the $T_{Gel}$ thereof being kept constant.

9. The process according to claim 1, wherein the viscosity of the gel-forming formulations (F) to be used increases—before injection into the formation—from portion to portion.

10. The process according to claim 1, wherein, on the basis of the analysis of the temperature distribution, the region between the injection well and the production well is divided into at least two partial regions, and a number of portions corresponding to the number of partial regions is forced in, the ratio of the volumes of the portions to be forced in being chosen according to the ratio of the cavity volumes of said partial regions.

11. The process according to claim 1, wherein the individual portions are injected directly in succession.

12. The process according to claim 1, wherein the forcing in of the individual portions is interrupted by a pause in which no formulation (F) is forced in.

13. The process according to claim 12, wherein water and/or steam is injected during the interruption.

14. The process according to claim 1, wherein process step (2) is effected by forcing a flooding medium through an injection well into the mineral oil deposit and removing crude oil through at least one production well.

15. The process according to claim 1, wherein the process is carried out after the steam flooding of the deposit.

16. The process according to claim 1, wherein the formulations (F) are acidic aqueous formulations which comprise at least water, a metal compound which is dissolved therein and can form gels on addition of bases, and a water-soluble activator which produces an increase in the pH of the aqueous solution at a temperature $T \geq T_{Gel}$.

17. The process according to claim 16, wherein the dissolved metal compound is an aluminum(III) salt.

18. The process according to claim 1, wherein the formulations (F) are aqueous solutions which comprise at least:

water, colloidal silicon compounds, a water-soluble activator which produces an increase in the pH of the aqueous solution at a temperature $T \geq T_{Gel}$.

19. The process according to claim 18, wherein the colloidal silicon compound is colloidal $SiO_2$.

20. The process according to claim 1, wherein the formulations (F) are aqueous solutions which comprise at least:

water, a water-soluble, crosslinkable polymer, and also water-soluble crosslinking components which effect a crosslinking of the polymer at a temperature $T \geq T_{Gel}$.

\* \* \* \* \*